United States Patent
Kokubu et al.

(10) Patent No.: US 10,283,768 B2
(45) Date of Patent: May 7, 2019

(54) POSITIVE ELECTRODE FOR NONAQUEOUS ELECTROLYTE SECONDARY BATTERY AND NONAQUEOUS ELECTROLYTE SECONDARY BATTERY USING THE SAME

(71) Applicant: SANYO Electric Co., Ltd., Daito-shi, Osaka (JP)

(72) Inventors: Takao Kokubu, Osaka (JP); Takeshi Ogasawara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 275 days.

(21) Appl. No.: 15/327,549

(22) PCT Filed: Jul. 7, 2015

(86) PCT No.: PCT/JP2015/003402
§ 371 (c)(1),
(2) Date: Jan. 19, 2017

(87) PCT Pub. No.: WO2016/017074
PCT Pub. Date: Feb. 4, 2016

(65) Prior Publication Data
US 2017/0155141 A1    Jun. 1, 2017

(30) Foreign Application Priority Data

Jul. 30, 2014  (JP) ................. 2014-154462

(51) Int. Cl.
| | | |
|---|---|---|
| *H01M 4/525* | (2010.01) | |
| *H01M 4/505* | (2010.01) | |
| *H01M 4/50* | (2010.01) | |
| *H01M 4/36* | (2006.01) | |
| *H01M 10/0525* | (2010.01) | |
| *H01M 4/58* | (2010.01) | |
| *H01M 10/052* | (2010.01) | |

(52) U.S. Cl.
CPC ............ *H01M 4/50* (2013.01); *H01M 4/366* (2013.01); *H01M 4/505* (2013.01); *H01M 4/525* (2013.01); *H01M 4/5825* (2013.01); *H01M 10/052* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2002/0119375 A1* | 8/2002 | Zhang .................. | H01M 4/485 429/232 |
| 2006/0177739 A1 | 8/2006 | Endo et al. | |
| 2011/0318653 A1 | 12/2011 | Matsumoto et al. | |
| 2015/0132666 A1 | 5/2015 | Ogata et al. | |

FOREIGN PATENT DOCUMENTS

| | | |
|---|---|---|
| CN | 102299309 A | 12/2011 |
| CN | 103247797 A | 8/2013 |
| JP | 2009-146739 A | 7/2009 |
| WO | 2005/008812 A1 | 1/2005 |
| WO | 2013/108571 A1 | 7/2013 |
| WO | 2014/049976 A1 | 4/2014 |
| WO | 2014/049977 A1 | 4/2014 |
| WO | 2014/050115 A1 | 4/2014 |
| WO | 2015/079664 A1 | 6/2015 |

OTHER PUBLICATIONS

Chen, Z. et al., "Structure change of LNCM in Li ion battery processes", Power Supply Technology; published on Aug. 31, 2010; vol. 134, No. 8, pp. 815-817; with partial English translation; cited in Chinese Search Report dated Aug. 29, 2018.

English translation of Search Report dated Aug. 29, 2018, issued in counterpart Chinese Patent Application No. 201580040095.2 (2 pages).

International Search Report dated Oct. 13, 2015, issued in counterpart International Application No. PCT/JP2015/003402 (2 pages).

\* cited by examiner

*Primary Examiner* — Wojciech Haske
(74) *Attorney, Agent, or Firm* — Westerman, Hattori, Daniels & Adrian, LLP (57) ABSTRACT

There is provided a positive electrode for nonaqueous electrolyte secondary batteries in which a decrease in the initial discharge voltage can be suppressed even when a positive electrode exposed to the air is used. The positive electrode for a nonaqueous electrolyte secondary battery according to an aspect of the present invention contains a lithium transition metal oxide constituted by a secondary particle formed by aggregation of primary particles. A rare-earth compound adheres to at least part of a surface of the secondary particle, and a compound containing lithium and boron adheres to at least part of the surface of the secondary particle and at least part of an interface between primary particles aggregated at the surface of the secondary particle.

6 Claims, 1 Drawing Sheet

POSITIVE ELECTRODE FOR NONAQUEOUS ELECTROLYTE SECONDARY BATTERY AND NONAQUEOUS ELECTROLYTE SECONDARY BATTERY USING THE SAME

TECHNICAL FIELD

The present invention relates to a positive electrode for nonaqueous electrolyte secondary batteries and a nonaqueous electrolyte secondary battery using the positive electrode.

BACKGROUND ART

With the recent accelerated reduction in the size and weight of mobile information terminals such as cellar phones, notebook computers, and smartphones, secondary batteries serving as driving power supplies have been required to have a higher capacity. Nonaqueous electrolyte secondary batteries, which are charged and discharged by the movement of lithium ions between positive and negative electrodes, have a high energy density and a high capacity and therefore are widely used as driving power supplies for the above mobile information terminals.

Furthermore, nonaqueous electrolyte secondary batteries have recently attracted attention as power supplies for driving, for example, power tools, electric vehicles (EVs), and hybrid electric vehicles (HEVs, PHEVs) and are promising for various uses. Such power supplies for driving are required to have a higher capacity that allows long-term operation and improved output characteristics in the case where charge and discharge are repeatedly performed with a large current within a relatively short time. In particular, when nonaqueous electrolyte secondary batteries are used as power tools, EVs, HEVs, PHEVs, and the like, a higher capacity needs to be achieved while output characteristics during charge and discharge with a large current are maintained.

For example, PTL 1 below suggests that when a group III element on the periodic table is provided on the surfaces of base particles of a positive electrode active material, the degradation of charge storage characteristics due to a decomposition reaction of an electrolytic solution that occurs at an interface between the positive electrode active material and the electrolytic solution when the charge voltage is increased can be suppressed.

PTL 2 below suggests that an increase in capacity and an improvement in charge-discharge efficiency can be achieved by coating a positive electrode active material containing lithium and at least one of nickel and cobalt with a borate compound and then heat-treating the positive electrode active material.

CITATION LIST

Patent Literature

PTL 1: International Publication No. 2005/008812
PTL 2: Japanese Published Unexamined Patent Application No. 2009-146739

SUMMARY OF INVENTION

Technical Problem

However, it has been found that the use of the techniques disclosed in PTL 1 and PTL 2 still poses a problem in that a decrease in the initial discharge voltage cannot be suppressed when the positive electrode active material and the positive electrode are exposed to the air.

According to an aspect of the present invention, it is an object to provide a positive electrode for nonaqueous electrolyte secondary batteries in which a decrease in the initial discharge voltage is suppressed even when the positive electrode active material and the positive electrode are exposed to the air, and a nonaqueous electrolyte secondary battery using the positive electrode.

Solution to Problem

According to an aspect of the present invention, a positive electrode for a nonaqueous electrolyte secondary battery contains a lithium transition metal oxide constituted by a secondary particle formed by aggregation of primary particles. The lithium transition metal oxide is represented by general formula $Li_{1+x}Ni_aMn_bCo_cO_{2+d}$ (x, a, b, c, and d satisfy $a+b+c=1$, $0<x\le0.2$, $0.20<a-b<0.65$, and $-0.1\le d\le0.1$). A rare-earth compound adheres to a surface of the secondary particle. A compound containing lithium and boron adheres to at least part of the surface of the secondary particle and at least part of an interface between primary particles aggregated at the surface of the secondary particle.

Advantageous Effects of Invention

According to an aspect of the present invention, there can be provided a positive electrode for nonaqueous electrolyte secondary batteries in which a decrease in the initial discharge voltage is suppressed even when the positive electrode active material and the positive electrode are exposed to the air, and a nonaqueous electrolyte secondary battery using the positive electrode.

DESCRIPTION OF EMBODIMENTS

An embodiment of the present invention will be described below. The embodiment is merely an example for carrying out the present invention, and the present invention is not limited to the embodiment.

[Nonaqueous Electrolyte Secondary Battery]

A nonaqueous electrolyte secondary battery according to an embodiment of the present invention includes a positive electrode, a negative electrode capable of intercalating and deintercalating lithium, and a nonaqueous electrolyte. For example, the nonaqueous electrolyte secondary battery according to this embodiment has a structure in which an electrode body obtained by winding or stacking a positive electrode and a negative electrode with a separator disposed therebetween and a nonaqueous electrolytic solution serving as a liquid nonaqueous electrolyte are accommodated in a battery case. However, the nonaqueous electrolyte secondary battery is not limited thereto. Hereafter, the constituent members of the nonaqueous electrolyte secondary battery will be described in detail.

[Positive Electrode]

A positive electrode for nonaqueous electrolyte secondary batteries according to an embodiment of the present invention contains a lithium transition metal oxide constituted by secondary particles formed by aggregation of primary particles. The lithium transition metal oxide is represented by general formula $Li_{1+x}Ni_aMn_bCo_cO_{2+d}$ (x, a, b, c, and d satisfy a+b+c=1, $0<x\leq0.2$, $0.20<a-b<0.65$, and $-0.1\leq d\leq0.1$). A rare-earth compound adheres to surfaces of the secondary particles. A compound containing lithium and boron adheres to at least part of the surfaces of the secondary particles and at least part of interfaces between primary particles aggregated at the surfaces of the secondary particles.

The positive electrode suitably includes a positive electrode current collector and a positive electrode mixture layer formed on the positive electrode current collector. The positive electrode current collector is formed of, for example, a conductive thin film such as a metal foil or alloy foil of aluminum or the like which is stable in the potential range of a positive electrode or a film including a metal surface layer made of aluminum or the like. The positive electrode mixture layer preferably contains a binding agent and a conductive agent, in addition to the positive electrode active material particles.

The degradation of the characteristics due to air exposure results from a LiOH production reaction. Specifically, Li in a surface layer of the lithium transition metal oxide is replaced with hydrogen through a reaction of moisture present on the surface of the lithium transition metal oxide with the lithium transition metal oxide. Thus, Li is extracted from the lithium transition metal oxide and LiOH is produced. However, if a rare-earth compound adheres to at least part of the surfaces of the lithium transition metal oxide secondary particles, the LiOH production reaction is suppressed. Therefore, the degradation of the initial charge-discharge characteristics due to air exposure, that is, the decrease in the discharge voltage during charge and discharge after air exposure can be suppressed.

Furthermore, the presence of a compound containing lithium and boron that adheres to at least part of the surfaces of the lithium transition metal oxide secondary particles and at least part of the interfaces between primary particles aggregated at the surfaces of the secondary particles decreases the surface energy of the lithium transition metal oxide, which suppresses adsorption of moisture in the air to the lithium transition metal oxide. This is an interaction obtained when the compound containing lithium and boron and the rare-earth compound coexist. This interaction is believed to be not obtained when the compound containing lithium and boron and the rare-earth compound do not coexist.

When the compound containing lithium and boron is present between primary particles of the lithium transition metal oxide secondary particles, the adsorption of moisture to portions between the primary particles, which easily causes the LiOH production reaction, does not easily occur and thus the LiOH production reaction can be suppressed. The portions between the primary particles have a larger area than the outermost surface and most of the LiOH production reaction occurs in these portions. Thus, the degradation of the characteristics due to air exposure can be considerably suppressed.

Furthermore, when the adsorption of moisture to the lithium transition metal oxide is suppressed, the amount of moisture used for the LiOH production reaction also decreases. Consequently, the LiOH production reaction that results in the degradation of the characteristics due to air exposure can be further suppressed, which further suppresses the degradation of the initial charge-discharge characteristics due to air exposure. As a result of such a synergistic effect, the LiOH production reaction that results in the degradation of the characteristics due to air exposure can be suppressed, and thus the degradation of the initial charge-discharge characteristics due to air exposure can be further suppressed.

In the lithium transition metal oxide represented by the general formula $Li_{1+x}Ni_aMn_bCo_cO_{2+d}$, the LiOH production reaction tends to occur as the value of a−b increases. This is because the increase in the value of a−b indicates an increase in the amount of trivalent nickel, and the trivalent nickel adsorbs moisture. That is, when the value of a−b is increased, the initial charge-discharge characteristics degrade because of air exposure. Therefore, the range of a−b is preferably more than 0.20 and less than 0.65.

If the value of a−b is 0.65 or more, the amount of trivalent nickel is excessively large and the LiOH production reaction readily occurs. Consequently, the LiOH production reaction is not sufficiently suppressed even in this configuration, which causes degradation of the initial charge-discharge characteristics due to air exposure.

If the value of a−b is 0.2 or less, the amount of trivalent nickel is small and the LiOH production reaction does not readily occur. Consequently, the initial charge-discharge characteristics hardly degrade because of air exposure and thus the improvement made by this configuration is pointless.

In the positive electrode for nonaqueous electrolyte secondary batteries according to this embodiment, the positive electrode active material particles are preferably obtained so that a compound containing lithium and boron further adheres to the surface of the lithium transition metal oxide. This further produces a synergistic effect of the rare-earth compound and the compound containing lithium and boron. Thus, the degradation of the initial charge-discharge characteristics due to air exposure can be further suppressed.

The rare-earth compound is preferably at least one compound selected from rare-earth hydroxides, oxyhydroxides, oxides, carbonates, phosphates, and fluorides. Among them, the rare-earth compound is particularly preferably at least one compound selected from rare-earth hydroxides and oxyhydroxides because such a rare-earth compound produces a larger effect of suppressing the degradation of the initial efficiency due to air exposure. The reason for this is that rare-earth hydroxides and oxyhydroxides increase the activation energy of the LiOH production reaction.

Examples of a rare-earth element in the rare-earth compound include scandium, yttrium, lanthanum, cerium, praseodymium, neodymium, samarium, europium, gadolinium, terbium, dysprosium, holmium, erbium, thulium, ytterbium, and lutetium. Among them, neodymium, samarium, and erbium are particularly preferred. This is because compounds of neodymium, samarium, and erbium have an average particle size smaller than that of other rare-earth compounds and readily precipitate on the entire surfaces of the lithium transition metal oxide particles in a uniformly dispersed manner.

Specific examples of the rare-earth compound include hydroxides and oxyhydroxides such as neodymium hydroxide, neodymium oxyhydroxide, samarium hydroxide, samarium oxyhydroxide, erbium hydroxide, and erbium oxyhydroxide; phosphates and carbonates such as neodymium phosphate, samarium phosphate, erbium phosphate, neodymium carbonate, samarium carbonate, and erbium carbonate; and oxides and fluorides such as neodymium oxide, samarium oxide, erbium oxide, neodymium fluoride, samarium fluoride, and erbium fluoride. Among them, hydroxides and oxyhydroxides are particularly preferred because they adhere to the entire surfaces of the particles in a more uniformly dispersed manner and can be selectively provided on the surfaces of the particles.

The average particle size of the rare-earth compound is preferably 1 nm or more and 100 nm or less and more preferably 10 nm or more and 50 nm or less. If the average particle size of the rare-earth compound is more than 100 nm, the particle size of the rare-earth compound excessively increases, which decreases the number of rare-earth compound particles that adhere to the surfaces of the lithium transition metal oxide particles. Consequently, an effect of improving low-temperature output may decrease. If the average particle size of the rare-earth compound is less than 1 nm, the surfaces of the lithium transition metal oxide particles are densely covered with a rare-earth compound. This degrades the properties of intercalating and deintercalating lithium ions on the surfaces of the lithium transition metal oxide particles, which may degrade charge-discharge characteristics.

The content (coating mass) of the rare-earth compound is preferably 0.005 mass % or more and 0.5 mass % or less and more preferably 0.05 mass % or more and 0.3 mass % or less relative to the total mass of the lithium transition metal oxide in terms of rare-earth element. If the content is less than 0.005 mass %, the above-described effect is not sufficiently produced by the rare-earth compound and the compound containing lithium and boron. Consequently, the degradation of the initial charge-discharge characteristics due to exposure of electrode plates sometimes cannot be suppressed. If the content is more than 0.5 mass %, the surfaces of the lithium transition metal oxide particles are excessively covered, and the initial charge-discharge characteristics may degrade regardless of whether the exposure of electrode plates is performed.

In the lithium transition metal composite oxide, the molar ratio of nickel, cobalt, and manganese is particularly 50:30:20, 52:22:26, 55:20:25, 60:20:20, 60:10:30, 70:10:20, 70:20:10, or 75:15:10. In particular, the ratio of nickel is preferably larger than that of cobalt and manganese from the viewpoint of not only further increasing the capacity of the positive electrode, but also readily causing the LiOH production reaction. They may be used alone or mixed with other lithium transition metal oxides.

The lithium transition metal oxide may further contain other additional elements. Examples of the additional elements include boron (B), magnesium (Mg), aluminum (Al), titanium (Ti), chromium (Cr), iron (Fe), copper (Cu), zinc (Zn), niobium (Nb), molybdenum (Mo), tantalum (Ta), zirconium (Zr), tin (Sn), tungsten (W), sodium (Na), potassium (K), barium (Ba), strontium (Sr), and calcium (Ca).

The lithium transition metal oxide is present in the form of particles having an average particle size of 2 to 30 μm. The particles may be secondary particles formed by bonding primary particles having a particle size of 100 nm to 10 μm.

The positive electrode for nonaqueous electrolyte secondary batteries according to this embodiment is produced by a method in which an aqueous solution prepared by dissolving a compound containing a rare-earth element is added to a suspension containing a lithium transition metal oxide.

When the above method is employed, the pH of the suspension is desirably adjusted and kept constant in the range of 6 or more and 10 or less while the aqueous solution prepared by dissolving a compound containing a rare-earth element is added to the suspension. This is because the lithium transition metal oxide sometimes dissolves at a pH of less than 6. At a pH of more than 10, the rare-earth compound particles unevenly adhere to a part of the surfaces of the lithium transition metal compound particles upon adding the aqueous solution prepared by dissolving a compound containing a rare-earth element to the suspension. Consequently, the rare-earth compound fine particles do not adhere to the entire surfaces of the lithium transition metal oxide particles in a uniformly dispersed manner.

This unevenly produces an effect of decreasing the surface energy. Furthermore, the LiOH production reaction is not sufficiently suppressed on the entire surfaces of the lithium transition metal oxide particles in some cases.

Alternatively, there can be employed a method in which an aqueous solution or solution prepared by dissolving a compound containing a rare-earth element is sprayed or added dropwise to the lithium transition metal composite oxide while the lithium transition metal composite oxide is stirred or a method in which a compound containing a rare-earth element is added to the lithium transition metal composite oxide and mechanically mixed. The mechanical mixing can be performed with, for example, an Ishikawa grinding mixer, a biaxial planetary mixer (e.g., HIVIS MIX manufactured by PRIMIX Corporation), or a Nobilta or a Mechano Fusion manufactured by HOSOKAWA MICRON Corporation.

However, when the rare-earth compound fine particles are more uniformly dispersed on the entire surfaces of the lithium transition metal composite oxide particles, the progress of the LiOH production reaction in the case where moisture is adsorbed onto the surface of the lithium transition metal composite oxide can be more effectively suppressed. Therefore, the method in which an aqueous solution prepared by dissolving a compound containing a rare-earth element is added to a suspension containing a lithium transition metal composite oxide is particularly preferably employed.

In the case where the aqueous solution prepared by dissolving a compound containing a rare-earth element is added to the suspension containing a lithium transition metal oxide, when the addition is performed simply in water, a hydroxide is precipitated. When a fluorine source is sufficiently added to the suspension in advance, a fluoride is precipitated. When carbon dioxide is sufficiently dissolved, a carbonate is precipitated. When phosphate ions are sufficiently added to the suspension, a phosphate is precipitated. Thus, the rare-earth compound can be precipitated on the surfaces of the lithium transition metal oxide particles. By controlling dissolved ions in the suspension, for example, a rare-earth compound including a hydroxide and a fluoride in a mixed manner is also obtained.

Subsequently, the lithium transition metal oxide particles on which the rare-earth compound is precipitated may be further heat-treated. The heat treatment temperature is preferably about 80° C. to 500° C. and more preferably about 80° C. to 400° C. If the heat treatment temperature is lower than 80° C., an excessively long time may be required for sufficient drying. If the heat treatment temperature is higher than 500° C., a part of the rare-earth compound that has adhered to the surfaces diffuses into the lithium transition metal composite oxide particles, which may decrease an effect of decreasing the surface energy. In particular, when the heat treatment temperature is 400° C. or lower, the rare-earth element hardly diffuses into the lithium transition metal composite oxide particles and is selectively present on the surfaces of the particles, which increases an effect of decreasing the surface energy.

In the case where a rare-earth hydroxide is caused to adhere to the surfaces, the hydroxide changes into an oxyhydroxide at about 200° C. to about 300° C. and further changes into an oxide at about 450° C. to about 500° C.

Therefore, when the heat treatment is performed at 400° C. or lower, a rare-earth hydroxide or oxyhydroxide that produces a large effect of suppressing the LiOH production reaction can be selectively provided to the surfaces of the particles and uniformly dispersed on the entire surfaces of the particles. Thus, high resistance to air exposure is achieved.

The compound containing a rare-earth element to be dissolved in the aqueous solution may be a compound prepared by dissolving, for example, a rare-earth acetate, a rare-earth nitrate, a rare-earth sulfate, a rare-earth oxide, or a rare-earth chloride in water or an organic solvent. In addition, a rare-earth sulfate, a rare-earth chloride, or a rare-earth nitrate prepared by dissolving a rare-earth oxide in sulfuric acid, hydrochloric acid, or nitric acid can also be used because such a compound is equivalent to the above compound prepared by dissolving a compound in water.

The compound containing lithium and boron is preferably lithium borate, lithium metaborate, or lithium tetraborate. Among them, lithium metaborate is particularly preferred. The use of the compound containing lithium and boron further produces an effect of suppressing the decrease in the initial discharge voltage due to air exposure.

The content of the compound containing lithium and boron is preferably 0.005 mass % or more and 5 mass % or less and more preferably 0.01 mass % or more and 0.2 mass % or less relative to the total mass of the lithium transition metal oxide in terms of boron. If the content is less than 0.005 mass %, an effect produced by the rare-earth compound and the compound containing lithium and boron is not sufficiently achieved and thus the degradation of the characteristics due to air exposure of electrode plates sometimes cannot be suppressed. If the content is more than 5 mass %, the amount of the positive electrode active material decreases by the excess amount of the compound, which decreases the capacity of the positive electrode.

An active material containing the compound containing lithium and boron is produced by a method in which an aqueous solution or solution prepared by dissolving a compound containing lithium and boron is sprayed or added dropwise to the lithium transition metal composite oxide while the lithium transition metal composite oxide is stirred or a method in which a compound containing lithium and boron is added to the lithium transition metal composite oxide and mechanically mixed. The mechanical mixing is performed with, for example, an Ishikawa grinding mixer, a biaxial planetary mixer (e.g., HIVIS MIX manufactured by PRIMIX Corporation), or a Nobilta or a Mechano Fusion manufactured by HOSOKAWA MICRON Corporation.

However, when the compound containing lithium and boron is caused to more uniformly adhere to the entire surfaces of the lithium transition metal composite oxide particles, the adsorption of moisture onto the surface of the lithium transition metal composite oxide can be further suppressed, which more effectively suppresses the progress of the LiOH production reaction due to the adsorption of moisture. Therefore, the method in which an aqueous solution or solution prepared by dissolving a compound containing lithium and boron is sprayed or added dropwise to the lithium transition metal composite oxide or the suspension containing the lithium transition metal composite oxide while the lithium transition metal composite oxide is stirred is particularly preferably employed.

The compound containing lithium and boron desirably adheres to at least part of the surfaces of the lithium transition metal oxide secondary particles and at least part of the interfaces between primary particles aggregated at the surfaces of the secondary particles. This form is particularly preferred because it increases a synergistic effect of the compound containing lithium and boron and the rare-earth compound.

The positive electrode active material particles in which the rare-earth compound adheres to the surface of the lithium transition metal oxide or the positive electrode active material particles in which the rare-earth compound and the compound containing lithium and boron adhere to the surface of the lithium transition metal oxide are not necessarily used alone for the positive electrode active material. The above positive electrode active material particles may be mixed with other positive electrode active materials.

In the present invention, the lithium transition metal composite oxide preferably has an average crystallite size L of 500 Å or more and 1700 Å or less determined by a Halder-wagner method from the integral breadth determined by a Pawley method.

The average crystallite size L of the lithium transition metal composite oxide in the present invention is determined as follows.

<Determination of Average Crystallite Size L>

1) The integral breadth $\beta_1$ is calculated from the integral intensity and peak height by a Pawley method with a split pseudo-voigt function using 10 peaks of Miller indices (100), (110), (111), (200), (210), (211), (220), (221), (310), and (311) in the X-ray diffraction pattern of X-ray diffraction standard material (National Institute of Standards and Technology (NIST) Standard Reference Materials (SRM) 660b ($LaB_6$)).

2) The integral breadth $\beta_2$ is calculated from the integral intensity and peak height by performing fitting by a Pawley method with a split pseudo-voigt function using 10 peaks of Miller indices (003), (101), (006), (012), (104), (015), (107), (018), (110), and (113) in the X-ray diffraction pattern of a measurement sample (lithium transition metal composite oxide).

3) The integral breadth $\beta$ derived from the measurement sample is calculated from the above results on the basis of the following formula (1).

$$\text{Integral breadth } \beta \text{ derived from measurement sample} = \beta_2 - \beta_1 \qquad (1)$$

4) The average crystallite size L derived from the measurement sample is calculated from the slope of an approximated straight line obtained by plotting $\beta^2/\tan^2\theta$ against $\beta/(\tan\theta \sin\theta)$ by a Halder-wagner method.

In the present invention, the average crystallite size of the lithium transition metal composite oxide is preferably 500 Å or more and 1700 Å or less. When the average crystallite size is 500 Å or more, the crystal grows sufficiently and is less likely to contain an impurity layer such as $Li_2CO_3$ or LiOH, which suppresses the degradation of the initial charge-discharge characteristics due to air exposure. An average crystallite size of more than 1700 Å is not preferred for an active material because the Li diffusion length in the crystal increases and the resistance increases.

The average crystallite size of the lithium transition metal composite oxide can be controlled by adjusting the firing temperature and the firing time. For example, the average crystallite size tends to decrease with decreasing the firing temperature. The average crystallite size tends to decrease with decreasing the firing time.

Alternatively, the average crystallite size can be controlled by a method in which the lithium transition metal composite oxide is synthesized by mixing an additive that facilitates or inhibits crystal growth or a method in which the amount of a compound serving as a Li source added during firing is controlled.

Alternatively, the average crystallite size can be controlled by, for example, controlling the particle size and particle size distribution of a precursor of the lithium transition metal composite oxide or adjusting the Ni, Mn, and Co composition. For example, the average crystallite size tends to increase with increasing the amount of a compound serving as a Li source added during firing.

The positive electrode active material is not particularly limited as long as it is a compound capable of reversibly intercalating and deintercalating lithium ions. Examples of the compound include compounds having a layered structure and being capable of intercalating and deintercalating lithium ions while a stable crystal structure is maintained, compounds having a spinel structure, and compounds having an olivine structure. When only positive electrode active materials of the same type are used or when different types of positive electrode active materials are used, the positive electrode active materials may have the same particle size or different particle sizes.

The binding agent may be, for example, a fluoropolymer or a rubber polymer. Examples of the fluoropolymer include polytetrafluoroethylene (PTFE), polyvinylidene fluoride (PVdF), and modified products of the foregoing. Examples of the rubber polymer include ethylene-propylene-isoprene copolymers and ethylene-propylene-butadiene copolymers. They may be used alone or in combination of two or more. The binding agent may be used together with a thickener such as carboxymethyl cellulose (CMC) or polyethylene oxide (PEO). The conductive agent may be, for example, a carbon material such as carbon black, acetylene black, Ketjenblack, or graphite. They may be used alone or in combination of two or more.

The positive electrode active material for nonaqueous electrolyte secondary batteries according to an embodiment of the present invention contains a lithium transition metal oxide, a rare-earth compound that adheres to the surface of the lithium transition metal oxide, and a compound containing lithium and boron that adheres to the surface of the lithium transition metal oxide. The rare-earth compound and the compound containing lithium and boron produce the above-described synergistic effect, and thus the degradation of the initial charge-discharge characteristics due to air exposure can be suppressed.

[Negative Electrode]

The negative electrode may be a known negative electrode and is produced by, for example, mixing a negative electrode active material and a binding agent with water or an appropriate solvent, applying the resulting mixture to a negative electrode current collector, and drying and rolling the negative electrode current collector. The negative electrode current collector is suitably formed of, for example, a conductive thin film such as a metal foil or alloy foil of copper or the like which is stable in the potential range of a negative electrode or a film including a metal surface layer made of copper or the like. The binding agent may be, for example, PTFE as in the case of the positive electrode, but is preferably a styrene-butadiene copolymer (SBR) or a modified product thereof. The binding agent may be used together with a thickener such as CMC.

Any negative electrode active material capable of reversibly intercalating and deintercalating lithium ions can be used. Examples of the negative electrode active material include carbon materials, metals such as Si and Sn and alloy materials that form alloys with lithium, and metal oxides.

These negative electrode active materials may be used alone or in combination of two or more. The negative electrode active material may be a combination of negative electrode active materials selected from carbon materials, metals and alloy materials that form alloys with lithium, and metal oxides.

[Nonaqueous Electrolyte]

The solvent of the nonaqueous electrolyte may be a known solvent. Examples of the solvent include cyclic carbonates such as ethylene carbonate, propylene carbonate, butylene carbonate, and vinylene carbonate; and chain carbonates such as dimethyl carbonate, methyl ethyl carbonate, and diethyl carbonate. In particular, a mixed solvent of the cyclic carbonate and the chain carbonate is preferably used as a nonaqueous solvent having a high lithium ion conductivity from the viewpoint of high dielectric constant, low viscosity, and low melting point. The volume ratio of the cyclic carbonate and the chain carbonate in the mixed solvent is preferably controlled to the range of 2:8 to 5:5.

Examples of compounds that can be used together with the above solvent include ester-containing compounds such as methyl acetate, ethyl acetate, propyl acetate, methyl propionate, ethyl propionate, and γ-butyrolactone; sulfone-containing compounds such as propane sultone; ether-containing compounds such as 1,2-dimethoxyethane, 1,2-diethoxyethane, tetrahydrofuran, 1,3-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds such as dimethylformamide. Furthermore, solvents obtained by replacing some of hydrogen atoms H of the above solvents with fluorine atoms F can also be used.

The solute of the nonaqueous electrolyte may be a known solute. Examples of the solute include fluorine-containing lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$ $LiC(C_2F_5SO_2)_3$, and $LiAsF_6$. Furthermore, a lithium salt [a lithium salt containing at least one of P, B, O, S, N, and Cl (e.g., $LiClO_4$)] other than the fluorine-containing lithium salt may be added to the fluorine-containing lithium salt. In particular, the fluorine-containing lithium salt and a lithium salt containing an oxalato complex as an anion are preferably mixed from the viewpoint of forming a stable coating film on the surface of the negative electrode in a high-temperature environment.

Examples of the lithium salt containing an oxalato complex as an anion include LiBOB [lithium bis(oxalato)borate], $Li[B(C_2O_4)F_2]$, $Li[P(C_2O_4)F_4]$, and $Li[P(C_2O_4)_2F_2]$. In particular, LiBOB capable of forming a stable coating film on the negative electrode is preferably used. These solutes may be used alone or in combination of two or more.

[Separator]

A known separator may be used. Examples of the separator include polypropylene separators, polyethylene separators, polypropylene-polyethylene multilayer separators, and separators whose surface is coated with a resin such as an aramid resin.

A layer formed of a known inorganic filler may be formed at an interface between the positive electrode and the separator or at an interface between the negative electrode and the separator. Examples of the filler include known oxides and phosphates containing one or more elements such as titanium, aluminum, silicon, and magnesium; and those obtained by surface-treating the oxides and phosphates with a hydroxide or the like. The filler layer may be formed by, for example, directly applying a filler-containing slurry to the positive electrode, the negative electrode, or the separator, or pasting a sheet formed of the filler on the positive electrode, the negative electrode, or the separator.

EXAMPLES

Hereafter, the embodiment of the present invention will be further described in detail based on Experimental Examples. Experimental Examples below are merely examples for describing the positive electrode for nonaqueous electrolyte secondary batteries, the nonaqueous electrolyte secondary battery, and the positive electrode active material for nonaqueous electrolyte secondary batteries to embody the technical idea of the present invention. The present invention is not limited to Experimental Examples below and can be appropriately modified without changing the spirit of the present invention.

First Experimental Example

Experimental Example 1

First, the configuration of a nonaqueous electrolyte secondary battery in Experimental Example 1 will be described.
[Production of Positive Electrode Active Material]

$[Ni_{0.55}Mn_{0.25}Co_{0.20}](OH)_2$ obtained by coprecipitation was roasted to obtain a transition metal oxide. The transition metal oxide and $Li_2CO_3$ were mixed with each other using an Ishikawa grinding mixer so that the molar ratio of Li and all transition metals was 1.06:1. The resulting mixture was then fired in an air atmosphere at 950° C. for 10 hours and pulverized to obtain a lithium-nickel-manganese-cobalt composite oxide having an average secondary particle size of about 14 μm and represented by $Li_{1.06}[Ni_{0.55}Mn_{0.25}Co_{0.20}]O_2$.

To 3.0 L of pure water, 1000 g of the thus-obtained lithium-nickel-manganese-cobalt composite oxide particles serving as a lithium transition metal oxide were added and stirred to prepare a suspension in which the lithium transition metal oxide was dispersed. Subsequently, an aqueous solution prepared by dissolving 5.42 g of erbium nitrate pentahydrate $[Er(NO_3)_3 \cdot 5H_2O]$ in 200 mL of pure water was added to the suspension. A 10 mass % aqueous nitric acid solution or a 10 mass % aqueous sodium hydroxide solution was appropriately added to adjust the pH of the solution containing the lithium transition metal oxide dispersed therein to 9 and keep the pH constant while the aqueous erbium nitrate pentahydrate solution was added to the suspension.

The obtained lithium transition metal oxide had a crystallite size of 950 Å.

After the completion of the addition of the erbium nitrate pentahydrate solution, suction filtration and washing with water were performed to obtain a powder. The powder was then dried at 120° C. to obtain a lithium transition metal oxide having a surface to which erbium hydroxide partly adhered.

A coating solution was prepared by adding 75 ml of distilled water to 2.2 g of lithium metaborate for dilution. The coating solution was sprayed to 500 g of the lithium transition metal oxide to which the erbium hydroxide adhered while the lithium transition metal oxide to which the erbium hydroxide adhered was stirred on a fluorine-processed vat using a polypropylene spatula. The lithium transition metal oxide to which the coating solution was sprayed was then dried at 120° C. for 2 hours. Thus, a positive electrode active material in which the lithium metaborate adhered to the surface of the lithium transition metal oxide was obtained.

Subsequently, the obtained lithium transition metal oxide powder to which the erbium hydroxide and the lithium metaborate adhered was heat-treated in an air atmosphere at 300° C. for 5 hours to produce positive electrode active material particles. As a result of the heat treatment at 300° C., all or most of the erbium hydroxide that adheres to the surface changes into erbium oxyhydroxide, and thus lithium transition metal oxide particles having surfaces to which erbium oxyhydroxide adheres are obtained. However, since part of the erbium hydroxide may be left, erbium hydroxide may adhere to the surfaces of the lithium transition metal oxide particles.

The obtained positive electrode active material particles were observed with a scanning electron microscope (SEM). It was confirmed that an erbium compound having an average particle size of 100 nm or less adhered to the entire surfaces of the lithium transition metal oxide particles in a uniformly dispersed manner. The coating mass of the erbium compound measured by ICP was 0.20 mass % relative to the lithium transition metal oxide particles (lithium-nickel-manganese-cobalt composite oxide) in terms of erbium. The coating mass of the lithium metaborate measured by ICP was 0.05 mass % relative to the lithium transition metal oxide particles in terms of boron.
[Production of Positive Electrode Plate]

The positive electrode active material particles, carbon black serving as a conductive agent, and an N-methyl-2-pyrrolidone solution prepared by dissolving polyvinylidene fluoride serving as a binding agent were weighed so that the mass ratio of the positive electrode active material particles, the conductive agent, and the binding agent was 95:2.5:2.5. They were kneaded to prepare a positive electrode mixture slurry.

Subsequently, the positive electrode mixture slurry was applied onto both surfaces of a positive electrode current collector formed of an aluminum foil, dried, and then rolled with a reduction roller. An aluminum current collecting tab was attached thereto to produce a positive electrode plate including positive electrode mixture layers formed on both surfaces of the positive electrode current collector.

The obtained positive electrode plate was processed by a cross-section polisher (CP) method so that the cross-section of the plate was observed. Then, the lithium transition metal oxide secondary particles contained in the electrode plate were observed with a wavelength-dispersive X-ray spectrometer (WDX). A boron element was observed at the interfaces between the primary particles aggregated at the surfaces of the active material secondary particles. It was confirmed that the compound containing lithium and boron adhered to at least part of the surfaces of the active material secondary particles and at least part of the interfaces between the primary particles aggregated at the surfaces of the secondary particles.

Figure 1:
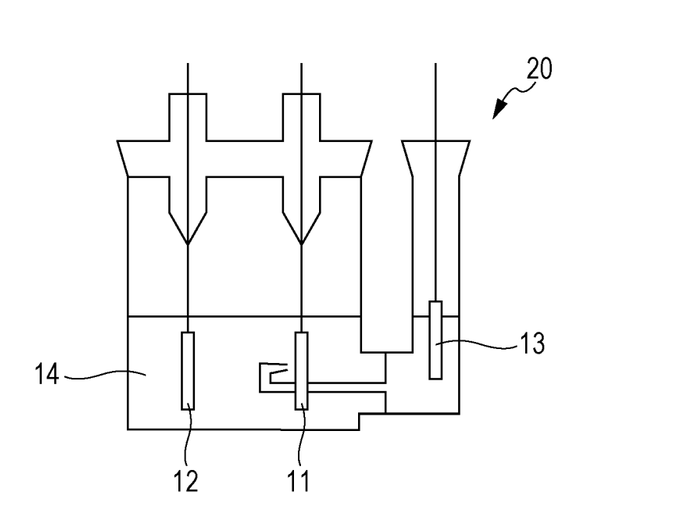
FIG. 1 schematically illustrates a three-electrode test cell used in Experimental Examples.

As illustrated in FIG. 1, a three-electrode test cell 20 was produced using the produced positive electrode plate as a working electrode 11 and metal lithium as a counter electrode 12 and a reference electrode 13. A nonaqueous electrolytic solution 14 was prepared as follows. $LiPF_6$ serving as a nonaqueous electrolyte was dissolved in a mixed solvent prepared by mixing ethylene carbonate and methyl ethyl carbonate at a volume ratio of 3:7 so that the concentration of $LiPF_6$ was 1 mol/L. The thus-produced three-electrode test cell is hereafter referred to as a battery A1.

[Production of Battery that Uses Positive Electrode Plate Exposed to Air]

A battery (battery B1) using a positive electrode plate exposed to the air was produced in the same manner as in the battery A1, except that the positive electrode plate was rolled with a reduction roller and then exposed to the air under the following conditions in the production thereof.

Air Exposure Conditions

The positive electrode plate was left to stand in a thermo-hygrostat at 30° C. and 50% for 5 days.

Experimental Example 2

A battery was produced in the same manner as in the battery A1, except that a lithium-nickel-manganese-cobalt composite oxide which was represented by $Li_{1.06}[Ni_{0.55}Mn_{0.25}Co_{0.20}]O_2$ and to which the erbium compound and lithium metaborate were not caused to adhere was used as positive electrode active material particles. The thus-produced battery is hereafter referred to as a battery A2.

A battery (battery B2) using a positive electrode plate exposed to the air was produced in the same manner as in the battery A2, except that the positive electrode plate was rolled with a reduction roller and then exposed to the air under the above conditions in the production thereof.

Experimental Example 3

A battery was produced in the same manner as in the battery A1, except that a lithium-nickel-manganese-cobalt composite oxide which was represented by $Li_{1.06}[Ni_{0.55}Mn_{0.25}Co_{0.20}]O_2$ and to which the erbium compound was not caused to adhere was used as positive electrode active material particles. The thus-produced battery is hereafter referred to as a battery A3.

A battery (battery B3) using a positive electrode plate exposed to the air was produced in the same manner as in the battery A3, except that the positive electrode plate was rolled with a reduction roller and then exposed to the air under the above conditions in the production thereof.

Experimental Example 4

A battery was produced in the same manner as in the battery A1, except that a lithium-nickel-manganese-cobalt composite oxide which was represented by $Li_{1.06}[Ni_{0.55}Mn_{0.25}Co_{0.20}]O_2$ and to which the lithium metaborate was not caused to adhere was used as positive electrode active material particles. The thus-produced battery is hereafter referred to as a battery A4.

A battery (battery B4) using a positive electrode plate exposed to the air was produced in the same manner as in the battery A4, except that the positive electrode plate was rolled with a reduction roller and then exposed to the air under the above conditions in the production thereof.

<Measurement of Initial Discharge Voltage>

The following charge-discharge test was performed on the batteries A1 to A4 produced using positive electrode plates not exposed to the air under the above conditions and on the batteries B1 to B4 produced using positive electrode plates exposed to the air under the above conditions in the batteries A1 to A4. The initial discharge voltage of each of the batteries was determined.

First-Cycle Charge Conditions

Constant current charge was performed at a current density of 0.4 mA/cm$^2$ at 25° C. until the voltage reached 4.3 V (vs. Li/Li+). Constant voltage charge was performed at a constant voltage of 4.3 V (vs. Li/Li+) until the current density reached 0.08 mA/cm$^2$.

First-Cycle Discharge Conditions

Constant current discharge was performed at a current density of 0.4 mA/cm$^2$ at 25° C. until the voltage reached 2.5 V (vs. Li/Li+).

Pause

The pause interval between the charge and the discharge was 10 minutes.

The charge and discharge under the above conditions were regarded as one cycle of charge and discharge. The average discharge voltage during discharge was measured and defined as an initial discharge voltage.

<Calculation of Characteristic Improvement Index Based on Surface Element>

Among the initial discharge voltages determined above, the initial discharge voltage without air exposure (the positive electrode plate was not exposed to the air) was defined as a "discharge voltage without exposure" and the initial discharge voltage with air exposure (the positive electrode plate was exposed to the air) was defined as a "discharge voltage with exposure". The decrease in discharge voltage was calculated from the difference between the discharge voltage without exposure and the discharge voltage with exposure of the corresponding battery on the basis of the following formula (1).

Decrease in discharge voltage ($V$)=(Discharge voltage without exposure)−(Discharge voltage with exposure)     (1)

Among the decreases in discharge voltage due to exposure, the decrease in discharge voltage of an active material in which neither the rare-earth element nor the compound containing lithium and boron was caused to adhere to the surface of the lithium transition metal oxide was defined as a "decrease in discharge voltage without surface elements", and the decrease in discharge voltage of an active material in which at least one of the rare-earth element and the compound containing lithium and boron was caused to adhere to the surface of the lithium transition metal oxide was defined as a "decrease in discharge voltage with surface elements". The characteristic improvement index based on surface elements was given on the basis of the following formula (2).

Characteristic improvement index based on surface elements ($V$)=(Decrease in discharge voltage with surface elements)−(Decrease in discharge voltage without surface elements)     (2)

Table 1 below collectively shows the results.

TABLE 1

|  | Rare-earth element of rare-earth compound | Compound containing lithium and boron | Characteristic improvement index based on surface elements (V) |
| --- | --- | --- | --- |
| Experimental Example 1 | Er | LiBO$_2$ | 24.1 |
| Experimental Example 2 | — | — | 0 |
| Experimental Example 3 | — | LiBO$_2$ | 0.53 |
| Experimental Example 4 | Er | — | −0.23 |

As is clear from the results in Table 1 above, the characteristic improvement index based on surface elements is much higher in the battery of Experimental Example 1 in which erbium oxyhydroxide and lithium metaborate adhere to the surfaces of the lithium transition metal oxide secondary particles than in the batteries of Experimental Example 3 and Experimental Example 4. Furthermore, there is almost no difference in characteristic improvement index based on surface elements between the battery of Experimental Example 3 in which only lithium metaborate adheres and the battery of Experimental Example 4 in which only erbium oxyhydroxide adheres, and the battery of Experimental Example 2 in which neither of them adheres. However, the battery of Experimental Example 1 that includes both the configurations of the batteries of Experimental Examples 3 and 4 produces an effect much larger than the individual effects of Experimental Examples 3 and 4. The reason for such results is believed to be as follows.

In the case of the battery of Experimental Example 1 in which erbium oxyhydroxide adheres to the surfaces of the secondary particles and lithium metaborate adheres to the surfaces of the secondary particles and at least part of the interfaces between primary particles aggregated at the surfaces of the secondary particles, the erbium oxyhydroxide suppresses the progress of the LiOH production reaction that results in the degradation of the characteristics due to air exposure. Therefore, the degradation of the initial charge-discharge characteristics due to air exposure, that is, the decrease in the charge-discharge efficiency during charge and discharge after air exposure is believed to be suppressed.

Furthermore, the surface energy of the lithium transition metal oxide decreases because of the interaction between the lithium metaborate and the erbium oxyhydroxide, which suppresses the adsorption of moisture in the air to the lithium transition metal compound. The decrease in the amount of the adsorption of moisture further suppresses the progress of the LiOH production reaction that results in the degradation of the characteristics due to air exposure. Thus, the degradation of the initial charge-discharge characteristics due to air exposure is believed to be further suppressed.

As a result of such a synergistic effect, the LiOH production reaction that results in the degradation of the characteristics due to air exposure can be suppressed. Thus, the degradation of the initial charge-discharge characteristics due to air exposure, that is, the decrease in the charge-discharge efficiency during charge and discharge after air exposure can be considerably suppressed.

The interaction between the boron compound and the erbium oxyhydroxide is produced by the boron compound when the boron compound and the rare-earth compound coexist. Therefore, when the boron compound is present alone, the interaction is believed to be not produced.

In the case of the battery of Experimental Example 4 in which only erbium oxyhydroxide adheres, the synergistic effect of the erbium oxyhydroxide and the lithium metaborate is not produced. That is, the presence of the erbium oxyhydroxide slightly suppresses the LiOH production reaction that results in the degradation due to air exposure. However, since the boron compound is not present, the surface energy of the lithium transition metal oxide cannot be decreased, which increases the amount of moisture adsorbed onto the surface of the lithium transition metal oxide. Therefore, the progress of the LiOH production reaction that results in the degradation due to air exposure is accelerated. Thus, the degradation of the initial charge-discharge characteristics due to air exposure is believed to be not sufficiently suppressed.

In the case of the battery of Experimental Example 3 in which only lithium metaborate adheres, the synergistic effect of the erbium oxyhydroxide and the lithium metaborate is also not produced. That is, when the lithium metaborate is not present together with the rare-earth compound, but is present alone, the surface energy is believed to be not decreased by the lithium metaborate as described above. Therefore, the adsorption of moisture in the air to the lithium transition metal oxide cannot be suppressed, which is believed to accelerate the progress of the LiOH production reaction.

Furthermore, since the rare-earth compound is not present in the battery of Experimental Example 3, the effect of suppressing the LiOH production reaction by the rare-earth compound is believed to be also not produced. That is, substantially the same results are obtained in Experimental Example 2 and Experimental Example 3, which shows that only the adhesion of the boron compound as in Experimental Example 3 does not produce an effect of suppressing the degradation of the initial charge-discharge characteristics due to air exposure.

In the case of the battery of Experimental Example 2, neither the erbium oxyhydroxide nor the lithium metaborate adheres to the surface of the lithium transition metal compound. Therefore, neither the effect produced by the erbium oxyhydroxide nor the synergistic effect produced by the erbium oxyhydroxide and the lithium metaborate is achieved. Consequently, the LiOH production reaction cannot be suppressed, and the degradation of the initial charge-discharge characteristics due to air exposure is believed to be not suppressed.

Second Experimental Example

Experimental Example 5

A battery was produced in the same manner as in the battery A1, except that samarium nitrate hexahydrate was used as a rare-earth compound instead of the erbium nitrate pentahydrate in the production of the positive electrode active material particles. The thus-produced battery is hereafter referred to as a battery A5.

In the produced positive electrode active material, all or most of samarium hydroxide that adhered to the surface was changed into samarium oxyhydroxide as a result of the heat treatment, and the samarium oxyhydroxide adhered to the surfaces of the positive electrode active material particles. However, since part of the samarium hydroxide may be left, samarium hydroxide may adhere to the surfaces of the lithium transition metal oxide particles.

The positive electrode active material particles were observed with a scanning electron microscope (SEM). It was confirmed that a samarium compound having an average particle size of 100 nm or less adhered to the entire surfaces of the lithium transition metal oxide particles in a uniformly dispersed manner. The coating mass of the samarium compound measured by ICP was 0.20 mass % relative to the lithium-nickel-manganese-cobalt composite oxide in terms of samarium.

A battery (battery B5) using a positive electrode plate exposed to the air and corresponding to the battery A5 was produced in the same manner as in the battery A5, except that the positive electrode plate was rolled with a reduction roller and then exposed to the air under the above conditions in the production thereof.

Experimental Example 6

A battery was produced in the same manner as in the battery A5, except that lithium metaborate was not added in the production of the positive electrode plate. The thus-produced battery is hereafter referred to as a battery A6.

A battery (battery B6) using a positive electrode plate exposed to the air and corresponding to the battery A6 was produced in the same manner as in the battery A6, except that the positive electrode plate was rolled with a reduction roller and then exposed to the air under the above conditions in the production thereof.

Experimental Example 7

A battery was produced in the same manner as in the battery A1, except that neodymium nitrate hexahydrate was used as a rare-earth compound instead of the erbium nitrate pentahydrate in the production of the positive electrode active material particles. The thus-produced battery is hereafter referred to as a battery A7.

In the produced positive electrode active material particles, all or most of neodymium hydroxide that adhered to the surface was changed into neodymium oxyhydroxide as a result of the heat treatment, and the neodymium oxyhydroxide adhered to the surface of the lithium transition metal oxide. However, since part of the neodymium hydroxide may be left, neodymium hydroxide may adhere to the surfaces of the lithium transition metal oxide particles.

The positive electrode active material was observed with a scanning electron microscope (SEM). It was confirmed that a neodymium compound having an average particle size of 100 nm or less adhered to the entire surfaces of the lithium transition metal oxide particles in a uniformly dispersed manner. The coating mass of the neodymium compound measured by ICP was 0.20 mass % relative to the lithium-nickel-manganese-cobalt composite oxide in terms of neodymium.

A battery (battery B7) using a positive electrode plate exposed to the air and corresponding to the battery A7 was produced in the same manner as in the battery A7, except that the positive electrode plate was rolled with a reduction roller and then exposed to the air under the above conditions in the production thereof.

Experimental Example 8

A battery was produced in the same manner as in the battery A7, except that lithium metaborate was not added in the production of the positive electrode plate. The thus-produced battery is hereafter referred to as a battery A8.

A battery (battery B8) using a positive electrode plate exposed to the air and corresponding to the battery A8 was produced in the same manner as in the battery A8, except that the positive electrode plate was rolled with a reduction roller and then exposed to the air under the above conditions in the production thereof.

The characteristic improvement index based on surface elements was calculated in the same manner as in First Experimental Example using the batteries A5 to A8 produced with a positive electrode plate not exposed to the air under the above conditions and the batteries B5 to B8 with a positive electrode plate exposed to the air under the above conditions in the batteries A5 to A8. Table 2 below collectively shows the results together with the results of the batteries of Experimental Examples 1 and 4.

TABLE 2

| | Rare-earth element of rare-earth compound | Compound containing lithium and boron | Characteristic improvement index based on surface elements (V) |
|---|---|---|---|
| Experimental Example 1 | Er | LiBO$_2$ | 24.1 |
| Experimental Example 4 | Er | — | −0.23 |
| Experimental Example 5 | Sm | LiBO$_2$ | 20.87 |
| Experimental Example 6 | Sm | — | 0.49 |
| Experimental Example 7 | Nd | LiBO$_2$ | 16.55 |
| Experimental Example 8 | Nd | — | −1.41 |

As is clear from the results in Table 2 above, the characteristic improvement index based on surface elements is much higher in the batteries of Experimental Examples 5 and 7 that use a lithium transition metal oxide in which the samarium compound or the neodymium compound is caused to adhere to part of the surface instead of the erbium compound than in the batteries of Experimental Examples 6 and 8 in which the boron compound is not added.

It is found from the above results that the samarium compound and the neodymium compound also produce the same effect as the erbium compound. Therefore, when the rare-earth compound is caused to adhere to the surface of the lithium transition metal oxide, the LiOH production reaction that results in the degradation of the characteristics due to air exposure is suppressed. Thus, the degradation of the initial charge-discharge characteristics due to air exposure is believed to be suppressed. This effect is believed to be an effect common to rare-earth compounds.

The comparison between the batteries of Experimental Example 1, Experimental Example 5, and Experimental Example 7 shows that the characteristic degradation index due to exposure is lower in the battery of Experimental Example 1 than in the batteries of Experimental Examples 5 and 7. This indicates that an erbium compound is particularly preferred among rare-earth elements.

Third Experimental Example

Experimental Example 9

A battery was produced in the same manner as in the battery A1, except that lithium tetraborate was used as a boron compound instead of the lithium metaborate in the production of the positive electrode plate. The thus-produced battery is hereafter referred to as a battery A9.

The obtained positive electrode plate was processed by a cross-section polisher (CP) method so that the cross-section of the plate was observed. Then, the lithium transition metal oxide secondary particles contained in the electrode plate were observed with a wavelength-dispersive X-ray spectrometer (WDX). A boron element was observed at the interfaces between primary particles aggregated at the surfaces of the active material secondary particles. It was confirmed that lithium tetraborate adhered to at least part of the surfaces of the active material secondary particles and at least part of the interfaces between primary particles aggregated at the surfaces of the secondary particles.

For the obtained positive electrode active material particles, the coating mass of the lithium tetraborate measured by ICP was 0.05 mass % relative to the lithium transition metal oxide particles (lithium-nickel-manganese-cobalt composite oxide) in terms of boron.

A battery (battery B9) using a positive electrode plate exposed to the air and corresponding to the battery A9 was produced in the same manner as in the battery A9, except that the positive electrode plate was rolled with a reduction roller and then exposed to the air under the above conditions in the production thereof.

Experimental Example 10

A battery was produced in the same manner as in the battery A9, except that a lithium-nickel-manganese-cobalt composite oxide which was represented by $Li_{1.06}[Ni_{0.55}Mn_{0.25}Co_{0.20}]O_2$ and to which the erbium compound was not caused to adhere was used as positive electrode active material particles. The thus-produced battery is hereafter referred to as a battery A10.

A battery (battery B10) using a positive electrode plate exposed to the air and corresponding to the battery A10 was produced in the same manner as in the battery A10, except that the positive electrode plate was rolled with a reduction roller and then exposed to the air under the above conditions in the production thereof.

The characteristic improvement index based on surface elements was calculated in the same manner as in First Experimental Example using the batteries A9 and A10 produced with a positive electrode plate not exposed to the air under the above conditions and the batteries B9 and B10 with a positive electrode plate exposed to the air under the above conditions in the batteries A9 and A10. Table 3 below collectively shows the results together with the results of the batteries of Experimental Examples 1 and 3.

TABLE 3

| | Rare-earth element of rare-earth compound | Compound containing lithium and boron | Characteristic improvement index based on surface elements (V) |
|---|---|---|---|
| Experimental Example 1 | Er | $LiBO_2$ | 24.1 |
| Experimental Example 3 | — | $LiBO_2$ | −0.23 |
| Experimental Example 9 | Er | $Li_2B_4O_7$ | 18.8 |
| Experimental Example 10 | — | $Li_2B_4O_7$ | −0.35 |

As is clear from the results in Table 3, the characteristic improvement index based on surface elements is much higher in the battery of Experimental Example 9 that uses a lithium transition metal oxide in which the lithium tetraborate is caused to adhere to part of the surface instead of the lithium metaborate than in the battery of Experimental Example 10 which corresponds to the battery of Experimental Example 9 and in which the erbium compound is not caused to adhere.

Therefore, the lithium tetraborate also produces the same effect as the lithium metaborate. This result is believed to be common in the case where a compound containing boron is used.

The comparison between the batteries of Experimental Example 1 and Experimental Example 9 shows that the characteristic improvement index based on surface elements is higher in the battery of Experimental Example 1 than in the battery of Experimental Example 9. This indicates that lithium metaborate is particularly preferred among the compounds containing lithium and boron.

Fourth Experimental Example

Experimental Example 11

A battery was produced in the same manner as in the battery A1, except that a lithium-nickel-manganese-cobalt composite oxide represented by $Li_{1.06}[Ni_{0.50}Mn_{0.30}Co_{0.20}]O_2$ was used in the production of the positive electrode active material particles. The thus-produced battery is hereafter referred to as a battery A11. The lithium-nickel-manganese-cobalt composite oxide represented by $Li_{1.06}[Ni_{0.50}Mn_{0.30}Co_{0.20}]O_2$ had a crystallite size of 940 Å.

A battery (battery B11) using a positive electrode plate exposed to the air and corresponding to the battery A11 was produced in the same manner as in the battery A11, except that the positive electrode plate was rolled with a reduction roller and then exposed to the air under the above conditions in the production thereof.

Experimental Example 12

A battery was produced in the same manner as in the battery A2, except that a lithium-nickel-manganese-cobalt composite oxide represented by $Li_{1.06}[Ni_{0.5}Mn_{0.30}Co_{0.20}]O_2$ was used in the production of the positive electrode active material particles. The thus-produced battery is hereafter referred to as a battery A12.

A battery (battery B12) using a positive electrode plate exposed to the air and corresponding to the battery A12 was produced in the same manner as in the battery A12, except that the positive electrode plate was rolled with a reduction roller and then exposed to the air under the above conditions in the production thereof.

Experimental Example 13

A battery was produced in the same manner as in the battery A3, except that a lithium-nickel-manganese-cobalt composite oxide represented by $Li_{1.06}[Ni_{0.5}Mn_{0.30}Co_{0.20}]O_2$ was used in the production of the positive electrode active material particles. The thus-produced battery is hereafter referred to as a battery A13.

A battery (battery B13) using a positive electrode plate exposed to the air and corresponding to the battery A13 was produced in the same manner as in the battery A13, except that the positive electrode plate was rolled with a reduction roller and then exposed to the air under the above conditions in the production thereof.

Experimental Example 14

A battery was produced in the same manner as in the battery A4, except that a lithium-nickel-manganese-cobalt composite oxide represented by $Li_{1.06}[Ni_{0.50}Mn_{0.30}Co_{0.20}]O_2$ was used in the production of the positive electrode active material particles. The thus-produced battery is hereafter referred to as a battery A14.

A battery (battery B14) using a positive electrode plate exposed to the air and corresponding to the battery A14 was produced in the same manner as in the battery A14, except that the positive electrode plate was rolled with a reduction roller and then exposed to the air under the above conditions in the production thereof.

Experimental Example 15

A battery was produced in the same manner as in the battery A1, except that a lithium-nickel-manganese-cobalt composite oxide represented by $Li_{1.06}[Ni_{0.52}Mn_{0.26}Co_{0.22}]O_2$ was used in the production of the positive electrode active material particles. The thus-produced battery is hereafter referred to as a battery A15. The lithium-nickelmanganese-cobalt composite oxide represented by $Li_{1.06}[Ni_{0.52}Mn_{0.26}Co_{0.22}]O_2$ had an average crystallite size of 935 Å.

A battery (battery B15) using a positive electrode plate exposed to the air and corresponding to the battery A15 was produced in the same manner as in the battery A15, except that the positive electrode plate was rolled with a reduction roller and then exposed to the air under the above conditions in the production thereof.

Experimental Example 16

A battery was produced in the same manner as in the battery A2, except that a lithium-nickel-manganese-cobalt composite oxide represented by $Li_{1.06}[Ni_{0.52}Mn_{0.26}Co_{0.22}]O_2$ was used in the production of the positive electrode active material particles. The thus-produced battery is hereafter referred to as a battery A16.

A battery (battery B16) using a positive electrode plate exposed to the air and corresponding to the battery A16 was produced in the same manner as in the battery A16, except that the positive electrode plate was rolled with a reduction roller and then exposed to the air under the above conditions in the production thereof.

Experimental Example 17

A battery was produced in the same manner as in the battery A3, except that a lithium-nickel-manganese-cobalt composite oxide represented by $Li_{1.06}[Ni_{0.52}Mn_{0.26}Co_{0.22}]O_2$ was used in the production of the positive electrode active material particles. The thus-produced battery is hereafter referred to as a battery A17.

A battery (battery B17) using a positive electrode plate exposed to the air and corresponding to the battery A17 was produced in the same manner as in the battery A17, except that the positive electrode plate was rolled with a reduction roller and then exposed to the air under the above conditions in the production thereof.

Experimental Example 18

A battery was produced in the same manner as in the battery A4, except that a lithium-nickel-manganese-cobalt composite oxide represented by $Li_{1.06}[Ni_{0.52}Mn_{0.26}Co_{0.22}]O_2$ was used in the production of the positive electrode active material particles. The thus-produced battery is hereafter referred to as a battery A18.

A battery (battery B18) using a positive electrode plate exposed to the air and corresponding to the battery A18 was produced in the same manner as in the battery A18, except that the positive electrode plate was rolled with a reduction roller and then exposed to the air under the above conditions in the production thereof.

Experimental Example 19

A battery was produced in the same manner as in the battery A1, except that a lithium-nickel-manganese-cobalt composite oxide represented by $Li_{1.06}[Ni_{0.70}Mn_{0.10}Co_{0.20}]O_2$ was used in the production of the positive electrode active material particles. The thus-produced battery is hereafter referred to as a battery A19. The lithium-nickel-manganese-cobalt composite oxide represented by $Li_{1.06}[Ni_{0.70}Mn_{0.10}Co_{0.20}]O_2$ had an average crystallite size of 984 Å.

A battery (battery B19) using a positive electrode plate exposed to the air and corresponding to the battery A19 was produced in the same manner as in the battery A19, except that the positive electrode plate was rolled with a reduction roller and then exposed to the air under the above conditions in the production thereof.

Experimental Example 20

A battery was produced in the same manner as in the battery A20, except that a lithium-nickel-manganese-cobalt composite oxide represented by $Li_{1.06}[Ni_{0.70}Mn_{0.20}Co_{0.20}]O_2$ was used in the production of the positive electrode active material particles. The thus-produced battery is hereafter referred to as a battery A20.

A battery (battery B20) using a positive electrode plate exposed to the air and corresponding to the battery A20 was produced in the same manner as in the battery A20, except that the positive electrode plate was rolled with a reduction roller and then exposed to the air under the above conditions in the production thereof.

Experimental Example 21

A battery was produced in the same manner as in the battery A3, except that a lithium-nickel-manganese-cobalt composite oxide represented by $Li_{1.06}[Ni_{0.70}Mn_{0.10}Co_{0.20}]O_2$ was used in the production of the positive electrode active material particles. The thus-produced battery is hereafter referred to as a battery A21.

A battery (battery B21) using a positive electrode plate exposed to the air and corresponding to the battery A21 was produced in the same manner as in the battery A21, except that the positive electrode plate was rolled with a reduction roller and then exposed to the air under the above conditions in the production thereof.

Experimental Example 22

A battery was produced in the same manner as in the battery A4, except that a lithium-nickel-manganese-cobalt composite oxide represented by $Li_{1.06}[Ni_{0.70}Mn_{0.10}Co_{0.20}]O_2$ was used in the production of the positive electrode active material particles. The thus-produced battery is hereafter referred to as a battery A22.

A battery (battery B22) using a positive electrode plate exposed to the air and corresponding to the battery A22 was produced in the same manner as in the battery A22, except that the positive electrode plate was rolled with a reduction roller and then exposed to the air under the above conditions in the production thereof.

The characteristic improvement index based on surface elements was calculated in the same manner as in First Experimental Example using the batteries A11 to A22 produced with a positive electrode plate not exposed to the air under the above conditions and the batteries B11 and B12 with a positive electrode plate exposed to the air under the above conditions in the batteries A11 to A22. Table 4 below collectively shows the results.

TABLE 4

| | Positive electrode active material | Rare-earth element of rare-earth compound | Compound containing lithium and boron | Characteristic improvement index based on surface elements (V) |
|---|---|---|---|---|
| Experimental Example 11 | $Li_{1.06}[Ni_{0.50}Mn_{0.30}Co_{0.20}]O_2$ | Er | $LiBO_2$ | −2.93 |
| Experimental Example 12 | | — | — | 0 |
| Experimental Example 13 | | — | $LiBO_2$ | −0.89 |
| Experimental Example 14 | | Er | — | −1.2 |
| Experimental Example 15 | $Li_{1.06}[Ni_{0.52}Mn_{0.26}Co_{0.22}]O_2$ | Er | $LiBO_2$ | 12.51 |
| Experimental Example 16 | | — | — | 0 |
| Experimental Example 17 | | — | $LiBO_2$ | −0.73 |
| Experimental Example 18 | | Er | — | −1.48 |
| Experimental Example 1 | $Li_{1.06}[Ni_{0.55}Mn_{0.25}Co_{0.20}]O_2$ | Er | $LiBO_2$ | 24.1 |
| Experimental Example 2 | | — | — | 0 |
| Experimental Example 3 | | — | $LiBO_2$ | 0.53 |
| Experimental Example 4 | | Er | — | −0.23 |
| Experimental Example 19 | $Li_{1.06}[Ni_{0.70}Mn_{0.10}Co_{0.20}]O_2$ | Er | $LiBO_2$ | 33.96 |
| Experimental Example 20 | | — | — | 0 |
| Experimental Example 21 | | — | $LiBO_2$ | 1.35 |
| Experimental Example 22 | | Er | — | −1.23 |

As is clear from the results in Experimental Example 11 to Experimental Example 14, there is no particular difference in characteristic improvement index based on surface elements between the batteries of Experimental Examples 11, 13, and 14 in which the composition of the lithium transition metal oxide is changed from $Li_{1.06}[Ni_{0.55}Mn_{0.25}Co_{0.20}]O_2$ to $Li_{1.06}[Ni_{0.50}Mn_{0.30}Co_{0.20}]O_2$ and also to which a surface element is caused to adhere and the battery of Experimental Example 12 in which a surface element is not caused to adhere.

The above results show that when the lithium transition metal oxide represented by $Li_{1.06}[Ni_{0.50}Mn_{0.30}Co_{0.20}]O_2$ is used, the synergistic effect of the rare-earth compound and the compound containing lithium and boron is not produced. This may be because in the composition of $Li_{1.06}[Ni_{0.50}Mn_{0.30}Co_{0.20}]O_2$, the decrease in discharge voltage due to exposure is extremely small even in the case of no surface elements in Experimental Example 12, and therefore the adhesion of surface elements does not contribute to noticeable improvement.

As is clear from the results in Experimental Examples 15 to 18, the characteristic improvement index based on surface elements is much higher in the battery of Experimental Example 15 in which the composition of the lithium transition metal oxide is changed from $Li_{1.06}[Ni_{0.55}Mn_{0.25}Co_{0.20}]O_2$ to $Li_{1.06}[Ni_{0.52}Mn_{0.26}Co_{0.22}]O_2$ and also the erbium compound and the lithium metaborate are caused to adhere to the surface than in the battery of Experimental Example 16 in which no surface element is caused to adhere and the batteries of Experimental Examples 17 and 18 in which only one of the erbium compound and the lithium metaborate is caused to adhere.

As is clear from the results in Experimental Examples 19 to 22, the characteristic improvement index based on surface elements is much higher in the battery of Experimental Example 19 in which the composition of the lithium transition metal oxide is changed from $Li_{1.06}[Ni_{0.55}Mn_{0.25}Co_{0.20}]O_2$ to $Li_{1.06}[Ni_{0.70}Mn_{0.10}Co_{0.20}]O_2$ and also the erbium compound and the lithium metaborate are caused to adhere to the surface than in the battery of Experimental Example 20 in which no surface element is caused to adhere and the batteries of Experimental Examples 21 and 22 in which only one of the erbium compound and the lithium metaborate is caused to adhere.

The above results show that even if the composition of the lithium transition metal oxide is changed from $Li_{1.06}[Ni_{0.55}Mn_{0.25}Co_{0.20}]O_2$, the effect produced when the rare-earth compound and the compound containing lithium and boron are caused to adhere to the surface is achieved. In consideration of the results in Experimental Examples 11 to 14, the composition of the lithium transition metal oxide affected by the rare-earth compound and the compound containing lithium and boron is believed to be a lithium transition metal oxide represented by general formula $Li_{1+x}Ni_aMn_bCo_cMn_dO_{2+e}$ (0.20<a−b<0.65).

INDUSTRIAL APPLICABILITY

The positive electrode for nonaqueous electrolyte secondary batteries according to an aspect of the present invention and the nonaqueous electrolyte secondary battery that uses the positive electrode can be applied to driving power supplies for mobile information terminals, such as cellar phones, notebook computers, smartphones, and tablet terminals, that are particularly required to have high energy density. They are also promising for high-output uses such as electric vehicles (EVs), hybrid electric vehicles (HEVs, PHEVs), and power tools.

REFERENCE SIGNS LIST

11 working electrode (positive electrode)
12 counter electrode (negative electrode)
13 reference electrode
14 nonaqueous electrolytic solution
20 three-electrode test cell

The invention claimed is:

1. A positive electrode for a nonaqueous electrolyte secondary battery, comprising a lithium transition metal oxide constituted by a secondary particle formed by aggregation of primary particles,
wherein the lithium transition metal oxide is represented by general formula $Li_{1+x}Ni_aMn_bCo_cO_{2+d}$ (x, a, b, c, and d satisfy a+b+c=1, 0<x≤0.2, 0.20<a−b<0.65, and −0.1≤d≤0.1),
a rare-earth compound adheres to at least part of a surface of the secondary particle, and
a compound containing lithium and boron adheres to at least part of the surface of the secondary particle and at least part of an interface between primary particles aggregated at the surface of the secondary particle.

2. The positive electrode for a nonaqueous electrolyte secondary battery according to claim 1, wherein the lithium transition metal oxide has a crystallite size of 500 Å to 1700 Å.

3. The positive electrode for a nonaqueous electrolyte secondary battery according to claim 1, wherein the compound containing lithium and boron is at least one selected from the group consisting of lithium borate, lithium metaborate, and lithium tetraborate.

4. A nonaqueous electrolyte secondary battery comprising a positive electrode,
wherein the positive electrode comprises a lithium transition metal oxide constituted by a secondary particle formed by aggregation of primary particles,
the lithium transition metal oxide is represented by general formula $Li_{1+x}Ni_aMn_bCo_cO_{2+d}$ (x, a, b, c, and d satisfy a+b+c 1, 0<x≤0.2, 0.20<a−b<0.65, and −0.1≤d≤0.1),
a rare-earth compound adheres to at least part of a surface of the secondary particle, and
a compound containing lithium and boron adheres to at least part of the surface of the secondary particle and at least part of an interface between primary particles aggregated at the surface of the secondary particle.

5. The nonaqueous electrolyte secondary battery according to claim 4, wherein the lithium transition metal oxide has a crystallite size of 500 Å to 1700 Å.

6. The nonaqueous electrolyte secondary battery according to claim 4, wherein the compound containing lithium and boron is at least one selected from the group consisting of lithium borate, lithium metaborate, and lithium tetraborate.

* * * * *